United States Patent
Chermanski

(10) Patent No.: US 7,677,613 B2
(45) Date of Patent: Mar. 16, 2010

(54) BIMINI TWIST KNOT MAKER

(76) Inventor: David Chermanski, 2145 Porpoise St., Merritt Island, FL (US) 32952

( * ) Notice: Subject to any disclaimer, the term of this patent is extended or adjusted under 35 U.S.C. 154(b) by 143 days.

(21) Appl. No.: 12/135,511

(22) Filed: Jun. 9, 2008

(65) Prior Publication Data

US 2009/0302606 A1 Dec. 10, 2009

(51) Int. Cl.
D03J 3/00 (2006.01)
(52) U.S. Cl. .................................. 289/17
(58) Field of Classification Search .......... 289/17; D22/149
See application file for complete search history.

(56) References Cited

U.S. PATENT DOCUMENTS

| | | | |
|---|---|---|---|
| 2,469,037 A | 5/1949 | Harvey | |
| 2,498,920 A | 2/1950 | Holland | |
| 2,502,751 A | 4/1950 | Roberts | |
| 2,609,155 A * | 9/1952 | Fosnaugh | 242/448.1 |
| 3,787,081 A | 1/1974 | Macy | |
| 4,336,960 A | 6/1982 | Seki | |
| 4,400,025 A | 8/1983 | Dennison | |
| 4,871,200 A | 10/1989 | Ryder et al. | |
| 5,240,295 A | 8/1993 | Spencer | |
| 5,690,369 A | 11/1997 | Steck, III | |
| 5,690,370 A | 11/1997 | Steck, III | |
| 7,011,346 B2 | 3/2006 | James, Sr. | |
| 7,309,086 B2 | 12/2007 | Carrier | |
| 7,334,822 B1 | 2/2008 | Hines, Jr. | |

* cited by examiner

Primary Examiner—Shaun R Hurley
(74) Attorney, Agent, or Firm—Hayworth, Chancy & Thomas, P.A.; Robert A. Lynch; Stephen C. Thomas

(57) ABSTRACT

A knot making device for quickly and efficiently tying a knot in a line. The device may be portable and capable of being secured to a stable surface such as a table or railing allowing for a user, such as an angler, to utilize the device while in the field. The device may comprise an extension arm having a loop holding assembly and a standing line holding assembly disposed at opposing ends of the extension arm. Both the loop holding assembly and the standing line holding assembly may further comprise a first and second tensioning member, respectively, for securely retaining the line. The device may further comprise a twist compactor element disposed along the extension arm and between the loop holding assembly and the standing line holding assembly. The twist compactor element may function to compress at least one twist present in the line while forming the knot.

16 Claims, 3 Drawing Sheets

BIMINI TWIST KNOT MAKER

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to knot tying devices, more specifically, the present invention relates to a device for tying a variety of knots including a Bimini Twist knot or a "20 times" knot.

2. Background Art

This invention is directed generally to a device for facilitating the tying of certain fishermen's knots, and more particularly to a portable device for facilitating the tying of a knot used in fishing, and known as either the "Bimini Twist" knot or the "20 times" knot.

The Bimini Twist knot has 100% knot strength and is particularly immune to "shock" or sudden stretch forces because of its twisting spiral design. Each Bimini Twist knot consists basically of two line sections, standing and tag, twisted together to form a linear spiral segment which is then wrapped with a tight coil of the tag section by unique hand manipulation of the tag section with simultaneous release of tension on the spiral segment, whereby the spiral segment can elongate, as a shock absorber, upon a strike from a fish. The knot is utilized widely in all angling disciplines (fly, spin, plug, and trolling tackle) for both freshwater and marine fish species. In these latter three angling disciplines, the knot is utilized generally in forming a double line that is connected to a leader material. The leader material is utilized to prevent the single-strand line on the fishing reel, from which the Bimini Twist knot is formed, from becoming nicked, frayed or severed from abrasive structures above and below the surface of the water or from the teeth, gill plates and other body parts of some fish species. In fly fishing applications, the knot is utilized commonly to one end of the tippet, or the weakest section, of a leader system. The knot can also be utilized effectively at both ends of the tippet for added resistance to sudden stress on the tippet. With a Bimini Twist knot formed at both ends of the tippet, a short section of stronger and more abrasion-resistant material can be applied between the tippet and fly or lure to protect the tippet from being frayed or severed from abrasive structures above and below the surface of the water or from the teeth, gill plates and other body parts of some fish species. Tying this knot skillfully and correctly can be of great difficulty, particularly for the uninitiated.

Practically speaking, the Bimini Twist knot is considered to be the most important knot in fishing as it is used for the tag end of virtually any braided or monofilament line in order to obtain a double line. It is also used for double-line leaders and offshore trolling, but is also popular with inshore and fly fishermen or for any fishing need which must achieve 100% knot strength, i.e. where the knot retains 100% of the original strength of the line. The Bimini Twist knot allows for the doubling of a fishing line by creating a long loop of fishing line which becomes stronger than the line itself. It can also be used to fashion a shock leader for casting, for making fly leaders, or for any of a variety of assignments which require a highly efficient, strong and reliable knot. However, it is a fairly complex knot to tie, requiring a number of steps, in which the fisherman must not only use both hands, but may also use a foot, bent knee, or other fixed object such as a door knob in the tying process. Tying a Bimini Twist knot longer than about five feet usually requires two people.

Since an improperly tied Bimini Twist knot can result in lost fish, lures, and terminal tackle, it is imperative that the knot be tied correctly. The difficulty in tying the Bimini twist knot, however, often results in fatal weakening of the single-strand line due to improper tying technique or in the fisherman not even attempting to tie the knot at all.

Surprisingly, there are relatively few jigs especially developed to assist in tying the Bimini Twist knot. One such device is that which is described in U.S. Pat. No. 4,871,200. This device, referred to as a "fixture" in the patent, is a fairly complex piece of machinery with many parts. It is impractical to use, limited to the size of line the device can handle, not portable, and its design makes its manufacture expensive. Many other knot jigs are not configured to facilitate the tying of the Bimini Twist knot.

Additionally, U.S. Pat. No. 7,011,346 to James, Sr., discloses a jig for tying Bimini Twist knots. The jig is disclosed to comprise a first section having a clip near its end for retaining fishing line, a second section having a clip near its end for retaining fishing line, and two outwardly extending arm members. This disclosed device appears to be a handheld device that would not allow an angler to use both hands in tying a knot. Furthermore, the compaction of the knot via outward movement of the arms produces an obtuse angle between the double line strands and the knot, which may make it impractical for handling extremely small-diameter fishing line.

U.S. Pat. No. 7,334,822 to Hines, Jr., discloses a knot tying assist device comprising a line twister and a movable compression element such as a pin. This disclosed device does not appear to be readily portable so as to function easily in both onboard and off board environments. The structure of the device may also make it inherently impractical for handling extremely small-diameter fishing line.

With the above exceptions, the vast majority of Bimini Twist knots have been tied almost exclusively by hand manipulation and without the aid of a device providing practical mechanical assistance.

The present mechanism makes tying the Bimini Twist knot easier, more precise, allows for variable length loop and maintains the proper set distance between knots, which also may be predetermined and adjusted.

BRIEF SUMMARY OF THE INVENTION

In accordance with one embodiment of the present invention, a knot making device for tying a knot in a line, the knot making device comprising a loop holding assembly for securing a loop section of the line, a standing line holding assembly for securing a standing line section of the line, a twist compactor element for compressing at least one twist of the knot, and an extension arm providing a first connection with the loop holding assembly, a second connection with the standing line holding assembly, and a third connection with the twist compactor element wherein the twist compactor element is disposed on the extension arm between the loop holding assembly and the standing line holding assembly.

It is an aspect of the present invention to provide a portable and efficient knot making device to assist anglers in tying knots on land or just as easily while out on the water.

It is also an aspect of the present invention to provide a knot making device which may allow for the production of a double line of unlimited length by a single individual.

It is yet still an aspect of the present invention to provide a knot making device which may assist in tying a variety of complex, commonly used fishing knots including but not limited to the Bimini Twist knot, the Blood knot, and the Chermanski Loop.

More particularly, it is an aspect of the present invention to provide a knot making device for creating a perfect Bimini Twist knot quickly and reliably in any type or size of fishing line material with no restrictions as to the length of the double line that a single individual may produce when utilizing the present inventive device.

DETAILED DESCRIPTION OF THE INVENTION

The knot making device of the present invention may be a portable device for creating a perfect Bimini Twist knot quickly and reliably in any type or size of fishing line material, such as but not limited to nylon monofilament, fluorocarbon monofilament, gel-spun polyethylene (GSP), braided Dacron® (e.g. polyethylene terephthalate), and any other materials known within the art. In its basic operation, the present inventive knot maker may produce a tightly compacted knot and a double line that may be of any length, in a preferred embodiment approximately 9 to 10 inches in length, which can be used in most marine and freshwater fishing situations.

The knot making device of the present invention also allows an angler to create an unlimited length of double line without requiring assistance from another individual. This longer section of double line may be attached to a leader for most recreational and commercial fishing situations. Historically, it usually required two individuals to form a double line greater than 6 feet in length when tying the Bimini Twist knot. As a result and intrinsic to its design, there are no restrictions to the length of double line formed using the present inventive knot making device.

The present inventive knot making device may be firmly secured to almost any surface via a fixation element. More specifically, the knot making device may be firmly secured in the field to convenient surfaces including but not limited to a boat railing, steering wheel, tree limb or any other generally cylindrical-shaped object via a fixation element further comprising a railing adapter accessory.

The Bimini Twist knot is a simple technique for producing a loop, or two strands, of line that, when tied properly, proves as strong as or stronger than the original single strand of the unknotted line. The Bimini Twist knot was originally developed for offshore big-game sportfishing and it was also known as the "20 times" knot, because of the number of twists typically used in its creation. The Bimini Twist knot, however, may be used in virtually every freshwater or marine fishing situation.

The most unique feature of the Bimini Twist knot is its shock-absorbing qualities. The elasticity of the twists forming the knot, and the double strands resulting from the knot, provide built-in shock absorption or impact resistance from sudden, jolting strikes or powerful runs from certain fish species. During a battle with a powerful fish, the tippet section or main line will be subjected to the forces of stress and strain. For example, when nylon or fluorocarbon monofilament line is initially pulled all the force or stress is used to stretch the line. The total elongation of a conventional nylon monofilament line may range from 20% to 30%.

Figure 1:
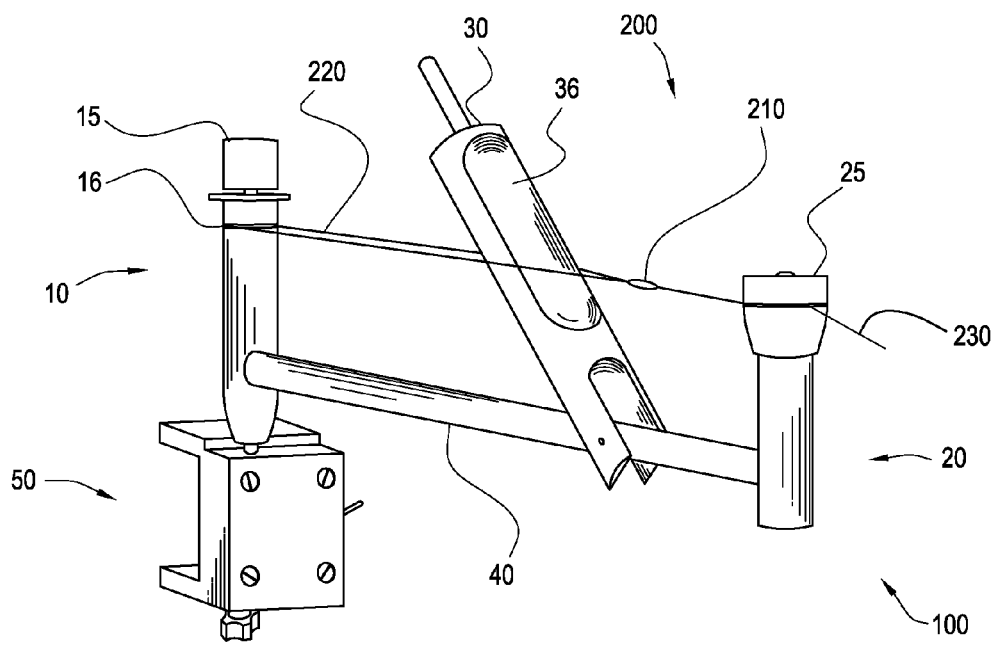
FIG. 1 depicts a perspective view of an embodiment of the knot making device of the present invention having a line disposed thereon at the completion of the knot making process.
Figure 2:
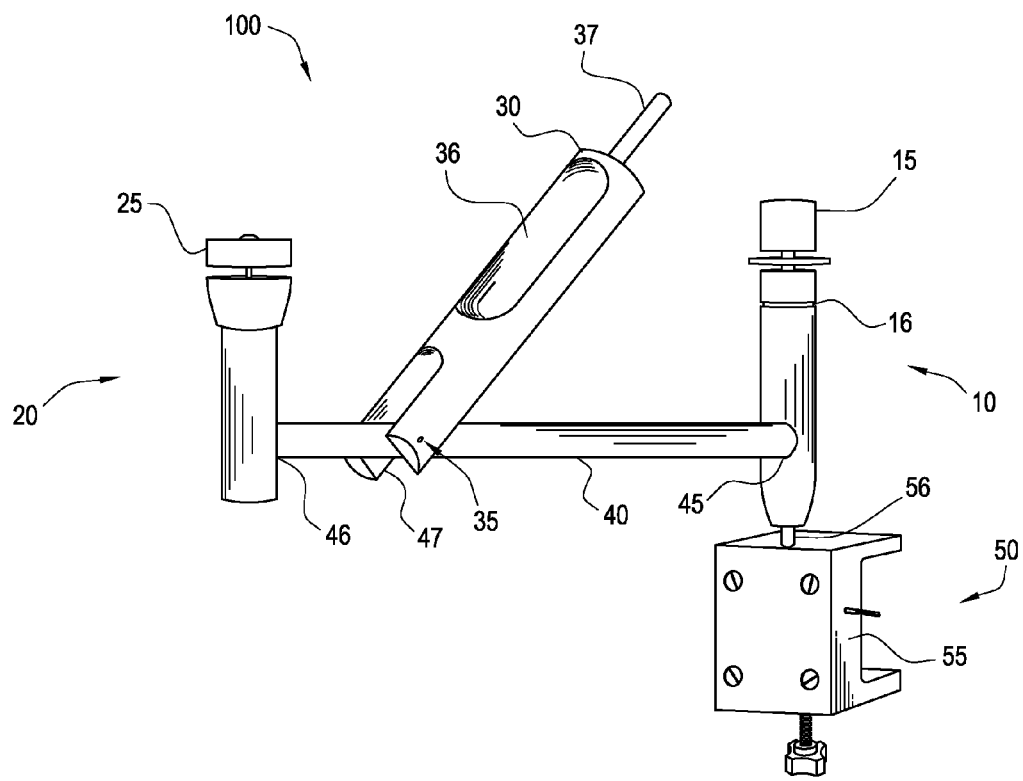
FIG. 2 depicts a perspective view on an embodiment of the knot making device of the present invention.

FIGS. 1-2 illustrate a preferred embodiment of a knot making device 100 of the present invention having a line 200 disposed thereon after a knot 210 has been formed in the line 200. The line 200, as shown, may comprise a knot 210 having at least one twist 240 (see FIG. 7), a loop section 220, a standing line section 230, and a tag section 250 (see FIG. 7). The knot making device 100 may comprise a loop holding assembly 10, a standing line holding assembly 20, a twist compactor element 30, and an extension arm 40. The loop holding assembly 10 and the standing line holding assembly 20 may be disposed at opposing ends of the extension arm 40 with the twist compactor element 30 disposed on the extension arm 40 therebetween. A fixation assembly 50 may secure the knot making device 100 to any surface selected by the user.

The knot making device 100 of the present invention and the components thereof may be comprised of any materials known within the art including but not limited to wood, plastic, metal, and the like. In a preferred embodiment, the material comprising the knot making device 100 allows the device 100 to float in water thereby minimizing the potential for loss of the portable device 100 while in use in the field.

As shown in FIG. 2, the extension arm 40 may provide for connection points with each of the other elements of the present inventive device 100. A first connection 45 may dispose the loop holding assembly 10 at one end of the extension arm 40 and a second connection 46 may dispose the standing line holding assembly 20 at the second end of the extension arm 40. A third connection 47 may dispose the twist compactor element 30 along the extension arm 40 at a location between the loop holding assembly 10 and the standing line holding assembly 20. The first connection 45, second connection 46, and third connection 47 may allow the extension arm 40 to be slidably disposed through loop holding assembly 10, the standing line holding assembly 20, and the twist compactor element 30, respectively. In such a manner, each of the above-respective structures may be slid along and then releasably secured to the extension arm 40 by any means known within the art. Such a configuration allows for the device 100 to be customized to fit a variety of knots 210 and/or loop section 220 lengths.

Figure 3:
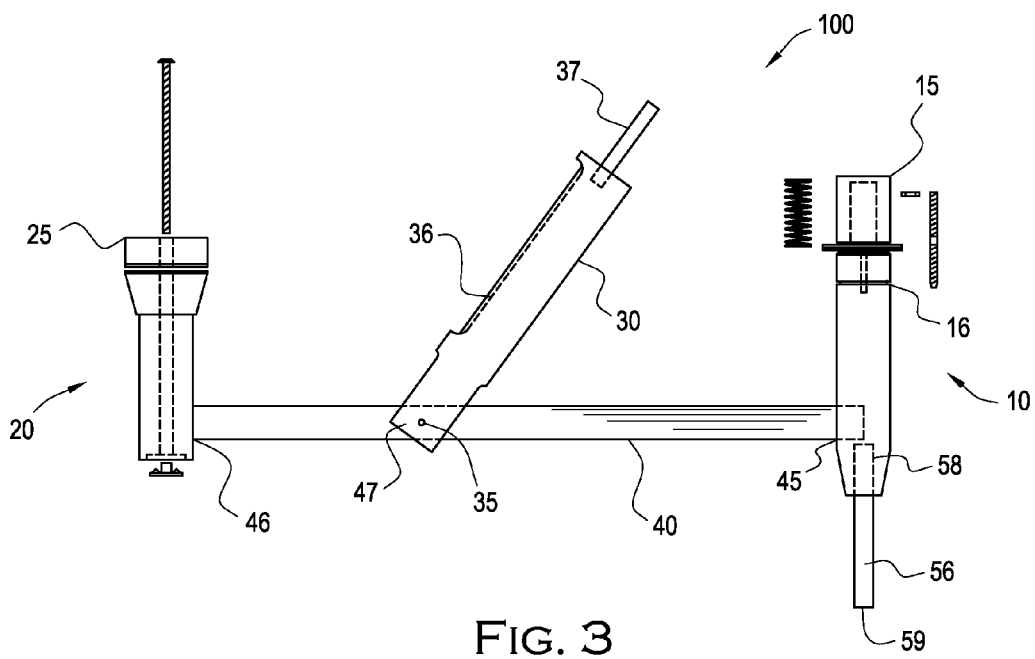
FIG. 3 depicts a schematic side view on another embodiment of the knot making device of the present invention.

Additionally, the fixation assembly 50 may communicate with the knot making device 100 of the present invention via the loop holding assembly 10, the standing line holding assembly 20, or the extension arm 40. A first attachment member 56 may provide for such communication with the fixation assembly 50. In a preferred embodiment, as depicted in FIGS. 1-3, the fixation assembly 50 communicates with the loop holding assembly 10 via the first attachment member 56. The first attachment member 56 may comprise any form of attachment known within the art including but not limited to a pin, a threaded engagement, a dovetail configuration, a tab and groove configuration, and the like. Preferably, the first attachment member 56 is a pin having a first end 58 disposed within a channel of the loop holding assembly 10 and a second end 59 of the pin disposed within a channel of the fixation assembly 50 (see FIGS. 2-3).

The loop holding assembly 10 may comprise the first connection 45 to the extension arm 40, a first tensioning member 15, and a recessed slot 16. The loop holding assembly 10 may be configured in a post-style configuration as depicted in FIGS. 1-3, but such a post-style configuration is only a preferred embodiment and other configurations are well within the scope of the present invention. In such a post-style preferred embodiment as shown in FIG. 2, the first connection 45 may be disposed in a lower portion of the loop holding assembly 10, the first tensioning member 15 may be disposed in an upper portion of the loop holding assembly 10, the recessed slot 16 may be disposed therebetween, and a fixation assembly 50 may be disposed in communication with the lower portion of the loop holding assembly 10. The first tensioning member 15 may be employed to secure the loop section 220 of a line 200 wherein the loop section 220 is capable of being an unlimited length. If the loop section 220 is to comprise a more traditional length (e.g. 9 to 10 inches in length) and the distance between the loop holding assembly 10 and the twist compactor element 30 is approximately the same length, the recessed slot 16 may be used to retain the distal end of the loop section 220 about the loop holding assembly 10 (see FIG. 1).

The standing line holding assembly 20 may comprise the second connection 46 to the extension arm 40 and a second tensioning member 25. The standing line holding assembly 20 may be configured in a post-style configuration as depicted in FIGS. 1-3, but such a post-style configuration is only a preferred embodiment and other configurations are well within the scope of the present invention. In such a post-style preferred embodiment as shown in FIG. 2, the second connection 46 may be disposed in a lower portion of the standing line holding assembly 20 and the second tensioning member 25 may be disposed in an upper portion of the standing line holding assembly 20. The second tensioning member 25 may be employed to secure the standing line section 230 of the line 200 thereby allowing the knot tyer a free hand to help complete the remaining steps in the tying process.

The first tensioning member 15 serves to secure the distal end of the loop section 220 of the line 200. If the length of the loop section 220 is less than the approximate distance between the loop holding assembly 10 and the twist compactor element 30, the distal end of the loop section 220 may be disposed in a recessed slot 16 located about the loop holding assembly 10. If the loop section 220 is of a length greater than the distance between the loop holding assembly 10 and the twist compactor element 30, the first tensioning member 15 may securely hold a section of the double line loop section 220 so that the at least one twist 240 of the knot 210 is disposed between the loop holding assembly 10 and the twist compactor element 30. In this manner, the first tensioning member 15 of the present inventive device 100 allows a user to create a double line loop 220 of unlimited length.

Both the first tensioning member 15 and the second tensioning member 25 may each respectively comprise a variety of embodiments. Each tensioning member 15,25 may comprise any line retaining structure known within the art including but not limited to a threaded knob, compression washers, compression spring structures, clips, tie down anchors, and the like. Preferred embodiments of the tensioning members 15,25 are depicted in FIGS. 1-3. As illustrated, the first tensioning member 15 may comprise a threaded knob and a spring-biased washer for providing a compressive retention force on the loop section 220 of the line 200. In such an embodiment, the threaded knob may be loosened by rotation in a counterclockwise direction thereby allowing the loop section 220 of the line 200 to be placed beneath the spring-biased washer. The threaded knob may then be rotated in a clockwise direction to securely retain the loop section 220 between the spring-biased washer and the main body of the loop holding assembly 10. The second tensioning member 25 may comprise a threaded knob disposed on the upper portion of the standing line holding assembly 20. The threaded knob may be rotated counterclockwise to separate engagement surfaces therebetween, and likewise the threaded knob may be rotated clockwise to securely abut the engagement surfaces therebetween (see FIG. 1). With the engagement surfaces separated, a standing line section 230 may be disposed therein and the threaded knob may then be rotated clockwise to securely hold the standing line section 230 between the abutting engagement surfaces.

The twist compactor element 30 may comprise a third connection 47 with the extension arm 40 wherein the twist compactor element 30 may be disposed along the extension arm 40 between the first connection 45 with the loop holding assembly 10 and the second connection 46 with the standing line holding assembly 20. As shown in FIGS. 1-3, the twist compactor element 30 may further comprise a cavity 36 therein to allow a user's finger access between the knot 210 and the twist compactor element 30 and/or a handle 37 to facilitate actuation of the twist compactor element 30. Actuation of the twist compactor element 30 serves to move the twist compactor element 30 into contact with at least one twist 240 of the knot 210 within the line 200. Such an actuation functions to tightly compress the at least one twist 240 and/or wraps of the knot 210.

The twist compactor element 30 may be actuated in a variety of functional embodiments. The embodiments within the scope of the present invention may include but are not limited to lever actuation, slidable actuation, and the like. FIGS. 1-3, 6, and 7 generally illustrated the lever actuation embodiment wherein the lever is actuated about the third connection 47 comprising a pivot point 35. In a preferred embodiment the twist compactor element 30 may pivot at least from a first position to a second position wherein the upper portion of the twist compactor element 30 approaches the standing line holding assembly 20. With the line 200 held within the device 100, the loop section 220 of the line 200 may be disposed about the twist compactor element 30. With the distal end of the line secured by the loop holding assembly 10, actuation of the twist compactor element 30 brings the twist compactor element 30 into contact with the at least one twist 240 of the knot 210. Manual actuation of the lever embodiment of the twist compactor element 30 against the at least one twist 240 of the knot 210 serves to tightly compress the at least one twist 240 and/or wraps of the knot 210. A second embodiment (not illustrated) may comprise slidable actuation of the twist compactor element 30. In such an embodiment, the third connection 47 may comprise a sleeve, collar, and/or the like being disposed about the extension arm 40. In this manner the twist compactor element 30 may be slidably disposed about the extension arm 40. A channel structure, tab-in-groove structure, or the like may be further incorporated into the slidable third connection 47 so as to prevent rotation of the twist compactor element 30 about the extension arm 40. Manual actuation of slidable actuation embodiment of the twist compactor element 30 may slide the twist compactor element into contact with the at least one twist 240 of the knot 210 to tightly compress the at least one twist 240 and/or wraps of the knot 210. A handle 37 disposed on the upper portion of the twist compactor element 30 may further facilitate actuation of any embodiment of the twist compactor element 30.

Figure 4:
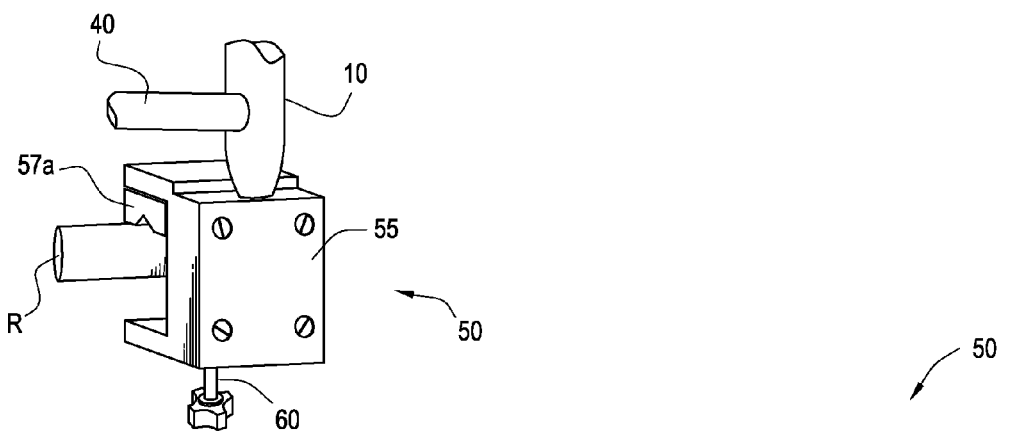
FIG. 4 depicts a perspective view of an embodiment of a fixation assembly of the knot making device of the present invention further comprising a first railing adaptor element.
Figure 5:
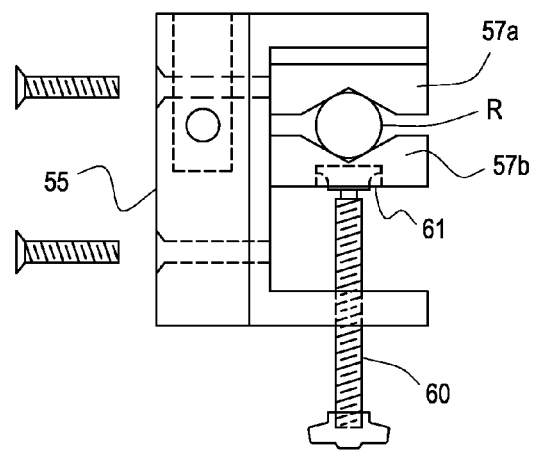
FIG. 5 depicts a schematic side view of an embodiment of a fixation assembly of the knot making device of the present invention.

The fixation assembly 50 may communicate with any element of the knot making device 100 for providing a secure attachment to a desired surface. Illustrative surfaces may include but are not limited to tables, benches, desks, railings, poles, and the like. The fixation assembly 50 may comprise any fastening means known within the art including but not limited to clamps, clips, cinches, harnesses, anchors, straps, braces, clasps, and the like. In a preferred embodiment as depicted in FIGS. 4-5, the fixation member 50 may comprise a C-clamp 55 structure and one or more railing adapter elements 57a,57b. The movable jaw functionality of the C-clamp 55 may be permitted by any manner known in the art including but not limited to a threaded engagement element 60, a releasable ratchet assembly, and the like. The exemplary C-clamp 55 depicted in FIGS. 4-5 comprises a threaded engagement element 60 for securing the fixation assembly 50 to the desired surface.

As shown in FIG. 4, a first railing adapter element 57a may be further utilized to beneficially adapt the fixation assembly 50 to securely attach to a generally cylindrical-shaped surface R. Such cylindrical-shaped surfaces R may include but are not limited to tubes, railings, rods, poles, posts, and the like. The first railing adapter element 57a may comprise a block having a wedge, groove, or channel therein along which the cylindrical-shaped surface R may be securely disposed (as shown in FIG. 4). The first railing adapter element 57a may be used in conjunction with a clamp 55 configuration of the fixation assembly 50 to allow for fixation of the knot making device 100 to a much wider variety of desired surfaces. Such a first railing adapter element 57a may beneficially assist anglers in utilizing the portable device 100 of the present invention in the field wherein the fixation assembly 50 may provide a secure attachment to any convenient surface such as a boat railing.

As depicted in FIG. 5, a second railing adapter element 57b may further be used to assist the fixation assembly 50 in securely attaching the knot making device 100 to an appropriate surface. The second railing adapter 57b may comprise a wedge, groove, or channel similar to that of the first railing adapter 57a, and in addition may further comprise a cavity 61 in which the functional surface of the threaded engagement element 60 may be disposed (as shown in FIG. 5). The fixation assembly 50 may be used with or without at least one railing adapter element 57a,57b. The fixation element 50 may further utilize a first railing adapter element 57a, a second railing adapter element 57b, or any combination thereof.

Figure 6:
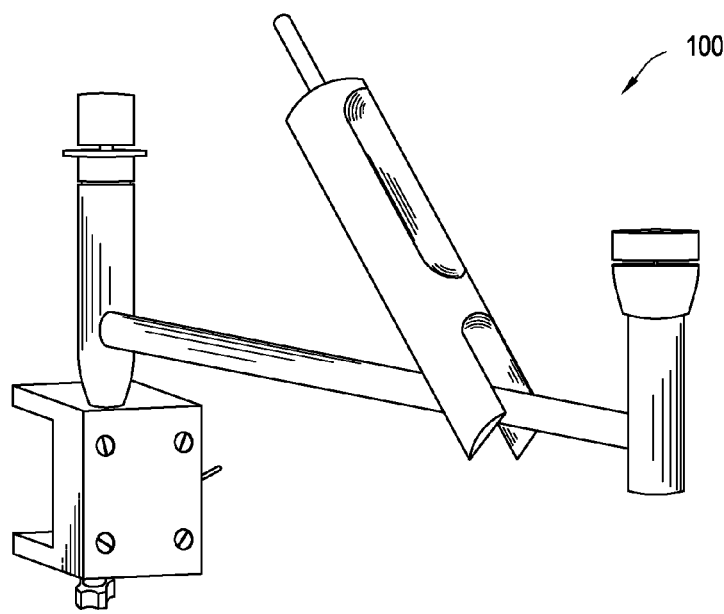
FIG. 6 depicts a perspective view on an embodiment of the knot making device of the present invention.
Figure 7:
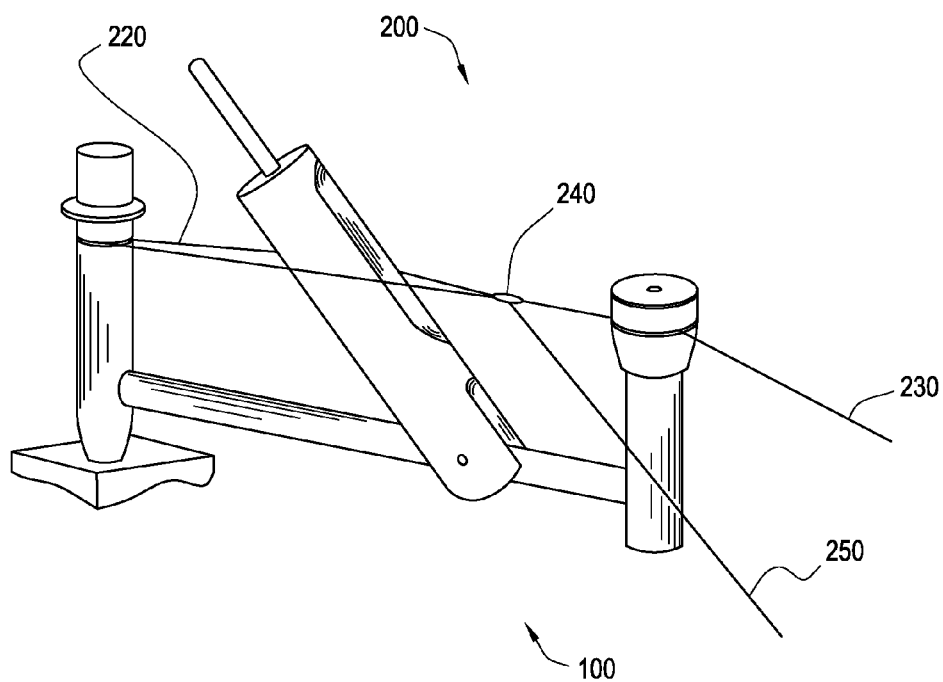
FIG. 7 depicts a perspective view of an embodiment of the knot making device of the present invention having a line disposed thereon during the knot making process.

General use of the disclosed invention may be easily understood from the broad steps disclosed below and, more particularly, as depicted in FIGS. 6 and 7. First, for a right-handed person to use the knot making device 100, the user may grip the line 200 about 12 inches from its end with the thumb and index finger of the left hand. They may then double the line 200 to form a single loop 220 about 12 inches long, securing it with the tag end 250 in the left hand. Next, three middle fingers of the right hand may be inserted inside the closed end of the loop 220 and the user's right hand may be rotated clockwise about 20 times to create twists in the loop 220.

Second, the user may spread the twists 240 open with the right hand and slip the loop 220 over both the loop holding assembly 10 and the twist compactor element 30. The end of the loop 220 may be positioned in the recessed slot 16 of the loop holding assembly 10. Next, the standing line 230 may be secured to the standing line holding assembly 20 by turning the top section of the second tensioning member 25 (e.g. a tensioning knob assembly) in a clockwise direction until the standing line 230 is held securely.

Third, the user may grasp the tag section 250 securely with the thumb and index finger of the right hand. The right hand may then be slowly moved away from the twists and in a forward direction forming a "V" comprising the tag section 250 and standing line section 230. Next, the tag section 250 may be pulled at about a 45-degree angle towards the twist compactor element 30 until the twists 240 are tightly compressed.

Fourth, the user may tie a half-hitch knot with the tag section 250 on the right leg of the loop section 220 followed by a half-hitch knot on both strands of the loop section 220. Finally, the user may tie a 3 to 4-turn half-hitch knot on both strands of the loop 220 to complete the knot 210.

The reader will see that, according to one embodiment of the invention, the present invention provides for a knot making device that is portable and provides a user with the convenience of being able to quickly and efficiently tie complex knots such as the Bimini Twist knot. The unique structure of the device allows for the twists of a knot to be effectively and routinely compressed and wrapped allowing for the knot to function at its optimal strength when in use. The device is fully portable and may be affixed to a wide variety of surfaces allowing the user, such as an angler, to tie complex knots even while out on the water.

While the above description contains much specificity, these should not be construed as limitations on the scope of any embodiment, but as exemplifications of the presently preferred embodiments thereof. Many other ramifications and variations are possible within the teachings of the various embodiments.

Thus the scope of the invention should be determined by the appended claims and their legal equivalents, and not by the examples given.

What is claimed is:

1. A knot making device for tying a knot in a line, said knot making device comprising:
   a loop holding assembly for securing a loop section of said line;
   a standing line holding assembly for securing a standing line section of said line;
   a twist compactor element for compressing at least one twist of said knot; and
   an extension arm providing a first connection with said loop holding assembly, a second connection with said standing line holding assembly, and a third connection with said twist compactor element wherein said twist compactor element is disposed on said extension arm between said loop holding assembly and said standing line holding assembly, wherein said twist compactor element is pivotally mounted to a pivot point on said extension arm at said third connection, said twist compactor element compressing said at least one twist of said knot via pivotable movement of said twist compactor element.

2. The knot making device of claim 1, further comprising; a fixation assembly for removably securing said knot making device to a surface.

3. The knot making device of claim 2, wherein said fixation assembly comprises a C-clamp.

4. The knot making device of claim 2, wherein said fixation assembly communicates with said loop holding assembly via a first attachment member.

5. The knot making device of claim 4, wherein said first attachment member comprises a pin.

6. The knot making device of claim 2, wherein said fixation assembly further comprises at least one railing adapter element for removably securing said knot making device to said surface.

7. The knot making device of claim 1, wherein said loop holding assembly comprises a first tensioning member for securing said loop section of said line to said loop holding assembly.

8. The knot making device of claim 1, wherein said standing line holding assembly comprises a second tensioning member for securing said standing line section of said line to said standing line holding assembly.

9. The knot making device of claim 1, wherein said extension arm is slidably disposed through said loop holding assembly and said loop holding assembly is releasably securable along the length of said extension arm.

10. The knot making device of claim 1, wherein said extension arm is slidably disposed through said standing line holding assembly and said standing line holding assembly is releasably securable along the length of said extension arm.

11. The knot making device of claim 1, wherein said loop holding assembly comprises a recessed slot thereon for retaining said loop section of said line.

12. A knot making device for tying a knot in a line, said knot making device comprising:
a loop holding assembly for securing a loop section of said line, wherein said loop holding assembly comprises a first tensioning member for securing said loop section of said line to said loop holding assembly;
a standing line holding assembly for securing a standing line section of said line, wherein said standing line holding assembly comprises a second tensioning member for securing said standing line section of said line to said standing line holding assembly;
a twist compactor element for compressing at least one twist of said knot; and
an extension arm providing a first connection with said loop holding assembly, a second connection with said standing line holding assembly, and a third connection with said twist compactor element wherein said twist compactor element is disposed on said extension arm between said loop holding assembly and said standing line holding assembly;
wherein said loop holding assembly comprises a recessed slot thereon for retaining said loop section of said line, wherein said twist compactor element is pivotally mounted to a pivot point on said extension arm at said third connection, said twist compactor element compressing said at least one twist of said knot via pivotable movement of said twist compactor element.

13. The knot making device of claim 12, further comprising;
a fixation assembly for removably securing said knot making device to a surface, wherein said fixation assembly communicates with said loop holding assembly via a first attachment member.

14. The knot making device of claim 13, wherein said fixation assembly comprises a C-clamp and said first attachment member comprises a pin.

15. The knot making device of claim 12, wherein said extension arm is slidably disposed through said loop holding assembly and said loop holding assembly is releasably securable along the length of said extension arm or said extension arm is slidably disposed through said standing line holding assembly and said standing line holding assembly is releasably securable along the length of said extension arm.

16. A knot making device for tying a knot in a line, said knot making device comprising:
a loop holding assembly for securing a loop section of said line, wherein said loop holding assembly comprises a first tensioning member for securing said loop section of said line to said loop holding assembly;
a standing line holding assembly for securing a standing line section of said line, wherein said standing line holding assembly comprises a second tensioning member for securing said standing line section of said line to said standing line holding assembly;
a twist compactor element for compressing at least one twist of said knot;
an extension arm providing a first connection with said loop holding assembly, a second connection with said standing line holding assembly, and a third connection with said twist compactor element wherein said twist compactor element is disposed on said extension arm between said loop holding assembly and said standing line holding assembly; and
a fixation assembly for removably securing said knot making device to a surface, wherein said fixation assembly communicates with said loop holding assembly via a first attachment member, said fixation assembly comprising a C-clamp;
wherein said twist compactor element is pivotally mounted to a pivot point on said extension arm at said third connection, said twist compactor element compressing said at least one twist of said knot via pivotable movement of said twist compactor element; and
wherein said loop holding assembly comprises a recessed slot thereon for retaining said loop section of said line.

* * * * *